US007252110B2

(12) United States Patent
Semeia

(10) Patent No.: US 7,252,110 B2
(45) Date of Patent: Aug. 7, 2007

(54) MEMBRANE VALVE AND SECOND STAGE PRESSURE REDUCER FOR TWO-STAGE UNDERWATER REGULATORS INCORPORATING SAID VALVE

(75) Inventor: Roberto Semeia, Lavagna (IT)

(73) Assignee: Scubapro Europe SRL, Casarza Ligure (GE) (IT)

( * ) Notice: Subject to any disclaimer, the term of this patent is extended or adjusted under 35 U.S.C. 154(b) by 391 days.

(21) Appl. No.: 10/770,090

(22) Filed: Feb. 2, 2004

(65) Prior Publication Data
US 2004/0182446 A1  Sep. 23, 2004

(30) Foreign Application Priority Data
Feb. 4, 2003  (IT)  ........................... SV2003A0003

(51) Int. Cl.
*F16K 15/14* (2006.01)
*A62B 18/10* (2006.01)

(52) U.S. Cl. ............. 137/512.15; 137/852; 128/205.24; 128/207.12

(58) Field of Classification Search ........... 137/512.15, 137/825, 854; 128/200.29, 204.26, 204.27, 128/205.24, 207.12
See application file for complete search history.

(56) References Cited

U.S. PATENT DOCUMENTS

| 1,867,478 | A |   | 7/1932  | Stelzner |
|-----------|---|---|---------|----------|
| 2,225,395 | A | * | 12/1940 | Young ................... 137/512.15 |
| 2,291,603 | A | * | 8/1942  | Barker .................. 137/512.15 |
| 2,326,651 | A | * | 8/1943  | Husted .................. 137/512.15 |
| 2,693,180 | A |   | 11/1954 | Galeazzi |
| 4,219,017 | A | * | 8/1980  | Shamlian et al. ...... 128/204.26 |
| 4,414,973 | A |   | 11/1983 | Matheson et al. |
| 4,729,401 | A |   | 3/1988  | Raines |
| 4,838,262 | A | * | 6/1989  | Katz .......................... 137/854 |
| 6,412,514 | B1 |  | 7/2002  | Raftis |

FOREIGN PATENT DOCUMENTS

GB  1351384  4/1974

* cited by examiner

*Primary Examiner*—John Rivell

(57) ABSTRACT

A membrane valve wherein the shutter disk is retained in contact with the valve seat during ejection of liquid or gas by means of one or more ribs that are substantially in contact with the shutter disk along one or more lines secant to the shutter disk and/or by means of one or more rows of secondary clamping pins that are engaged in matching openings on the valve seat. Further, a second stage pressure reducer for two-stage underwater regulators incorporating a membrane valve wherein the shutter disk is retained in contact with the valve seat during exhalation of gas by means of one or more ribs that are substantially in contact with the shutter disk along one or more lines secant to the shutter disk and/or by means of one or more rows of secondary clamping pins that are engaged in matching openings on the valve seat.

26 Claims, 6 Drawing Sheets

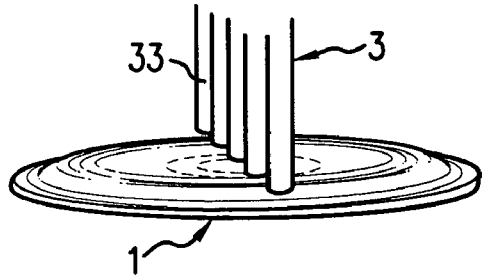
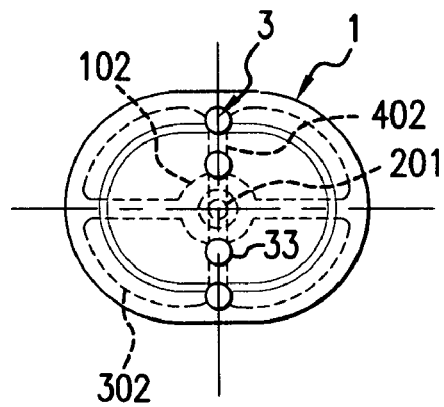
FIG.15A  FIG.15B
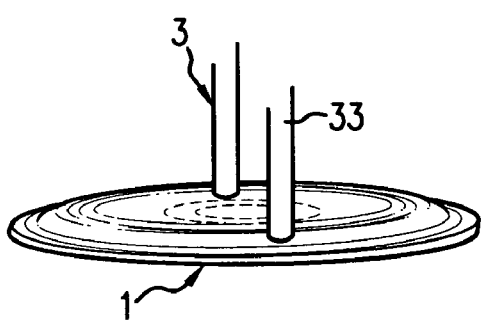
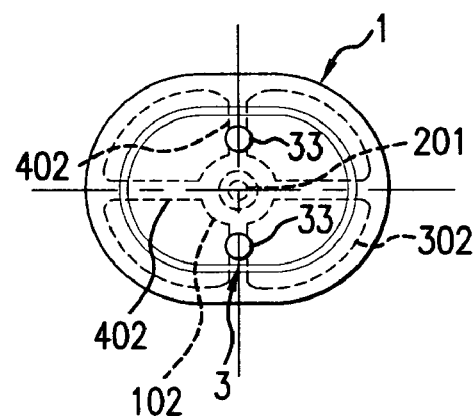
FIG.16A  FIG.16B
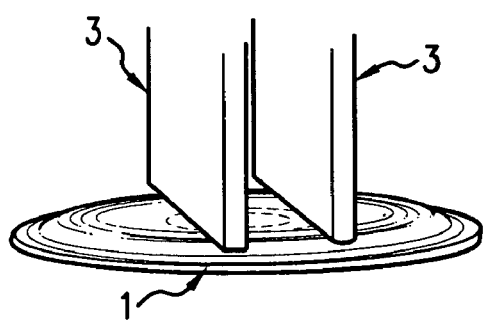
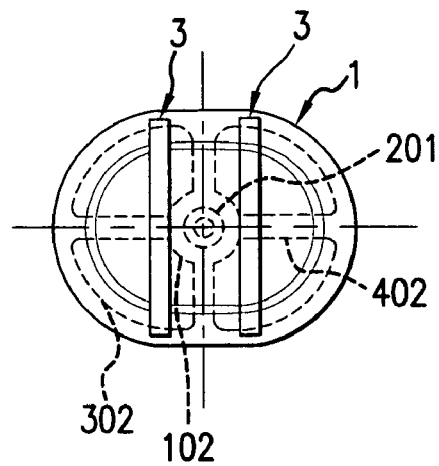
FIG.17A  FIG.17B

MEMBRANE VALVE AND SECOND STAGE PRESSURE REDUCER FOR TWO-STAGE UNDERWATER REGULATORS INCORPORATING SAID VALVE

CROSS REFERENCE TO RELATED APPLICATIONS

This patent application claims the priority of foreign patent application SV2003A000003, filed in Italy on Feb. 4, 2003 and titled "Valvola a membrana e secondo stadio di riduzione di pressione per erogatori bistadio per uso subacqueo provvisto di detta valvola."

BACKGROUND OF THE INVENTION

Membrane valves are used in a variety of fields and more particularly in underwater breathing apparatus, for example to regulate air outflow in pressure regulators and water outflow in masks and snorkels.

FIG. 1 illustrates a membrane valve according to the prior art, which comprises a shutter disk 1 of flexible material and a valve seat 2 with a continuous surface and one opening. Shutter disk 1 includes a cap of circular perimeter with a central portion that is essentially flat and further with a peripheral sealing lip 101, of essentially conical shape, that rests on annular wall 202 of valve seat 2. A primary clamping pin 201 extends from the central portion of the concave side of the cap of shutter disk 1 and elastically engages shutter disk 1 in the opening of valve seat 2.

The side of valve seat 2 that is opposite to shutter disk 1 delimits a chamber with controlled pressure. As shown in FIG. 2, in the event of overpressure within the chamber, shutter disk 1 deforms from its rest position and sealing lip 101 lifts up from annular wall 202, causing the membrane valve to open. While the lifting height of sealing lip 101 is substantially uniform along the perimeter of shutter disk 1, the outflow of gas or liquid through the central opening of valve seat 2 causes a swelling deformation of shutter disk 1. Because some of the chamber overpressure is absorbed by the deformation of shutter disk 1, such swelling deformation contributes beneficially to a decrease in chamber pressure, but at the same time hinders the outflow of liquid or gas through the valve opening, causing only a relatively thin passage to develop between sealing lip 101 and circular wall 202.

FIG. 3 illustrates a variation in the prior art wherein a shutter disk of elongated shape is employed. In this variation, the shutter disk may have one primary clamping pin, as shown in FIG. 3, or two primary clamping pins, each situated substantially in one of the foci of the elongated shape or in one of the centers of the arched end. While the elongated shape increases the outflow area due to the longer perimeter of sealing lip 101, the two-pin design does not improve on the swelling problem encountered with circular membranes and with one-pin designs. On the contrary, the portion of the shutter disk situated between the two primary clamping pins is more prone to swelling than with a single pin design, thereby causing the detrimental effect on the outflow of liquid or gas to worsen as compared to a one-pin design.

The swelling problems of shutter disks are also present in membrane valve designs wherein no annular wall 202 is present on the surface of valve seat 2.

Membrane valves are employed in a variety of applications. Specifically, membrane valves are employed in second stage pressure reducers for two-stage underwater regulators to regulate the outflow of spent gas that the diver has exhaled.

In second stage pressure reducers according to the prior art, a case contains a supply chamber where breathing gas is stored. Breathing gas is drawn into the supply chamber through an inlet connected to a first stage pressure reducer, which inlet is opened or closed by a spring valve housed inside the supply chamber. The spring valve opens when a depression, generally caused by the inhalation of the diver, causes the spring to contract and remains closed otherwise. Breathing gas is eventually delivered to the user through a mouthpiece connected to an outlet extending from the supply chamber.

A level area on the peripheral wall of second stage case includes a membrane valve regulating the outflow of spent gas that the user has exhaled. The membrane valve comprises a valve seat with an annular wall, which annular wall is in sealing contact with the sealing peripheral lip of the shutter disk, and the valve seat further comprises an opening, through which the spent gas is discharged. A primary clamping pin engages the shutter disk to the valve seat.

The shutter disk is in contact with the outer face of the level area on the second stage case and may be surrounded by an outflow duct, which is defined by the peripheral wall of the second stage case and by a C-shaped element affixed to the second stage wall. The outflow duct communicates with the external environment through orifices at the head sections of such outflow duct.

BRIEF SUMMARY OF THE INVENTION

This invention relates to a membrane valve, and more particularly to a membrane valve wherein the shutter disk is retained in contact with the valve seat during ejection of liquid or gas by means of one or more ribs that are substantially in contact with the shutter disk along one or more lines secant to the shutter disk and/or by means of one or more rows of secondary clamping pins that are engaged in matching openings on the valve seat.

This invention further relates to a second stage pressure reducer for two-stage underwater regulators, and more particularly to a second stage pressure reducer for two-stage underwater regulators incorporating a membrane valve wherein the shutter disk is retained in contact with the valve seat by means of one or more ribs that are substantially in contact with the shutter disk along one or more lines secant to the shutter disk and/or by means of one or more rows of secondary clamping pins that are engaged in matching openings on the valve seat.

An advantage of the present invention is to increase the operating performance of a membrane valve by decreasing the swelling deformation of the central portion of the shutter disk during the outflow of liquid or gas, thereby preventing the retention of liquid or gas under the shutter disk and facilitating the ejection of gas or liquid.

Another advantage of the present invention is to increase the operating performance of a membrane valve by forcing the shutter disk to open in book-like fashion during ejection of gas or liquid, thereby increasing the lift of the free peripheral edges of the shutter disk and the available passageways for the gas or liquid.

A further advantage of the present invention is the ability to fine-tune the operating performance of a membrane valve by varying the number, type and positions of the stop ribs and/or of the secondary clamping pins.

Yet another advantage of the present invention is to increase the operating performance of a second stage pressure reducer for two-stage underwater regulators by employing a membrane valve according to the present invention for the exhalation of gas.

Still another advantage of the present invention is to improve the maintenance and repair activities for a second stage pressure reducer for two-stage underwater regulators comprising an outflow duct by employing an outflow duct with different sections and by providing access to the membrane valve through a section of the outflow duct that can be opened or removed.

Other advantages of the present invention will become apparent from the following descriptions, taken in connection with the accompanying drawings, wherein by way of illustration and example, embodiments of the present invention are disclosed.

BRIEF DESCRIPTION OF THE SEVERAL VIEWS OF THE DRAWINGS

FIGS. 15A and 15B illustrate a perspective and a plane view of a membrane valve according to a fourth embodiment of the present invention.

FIGS. 16A and 16B illustrate a perspective and a plane view of a membrane valve according to a variation of the fourth embodiment of the present invention.

FIGS. 17A and 17B illustrate a perspective view and a plane view of a membrane valve according to a fifth embodiment of the present invention.

DETAILED DESCRIPTION OF THE INVENTION

Detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
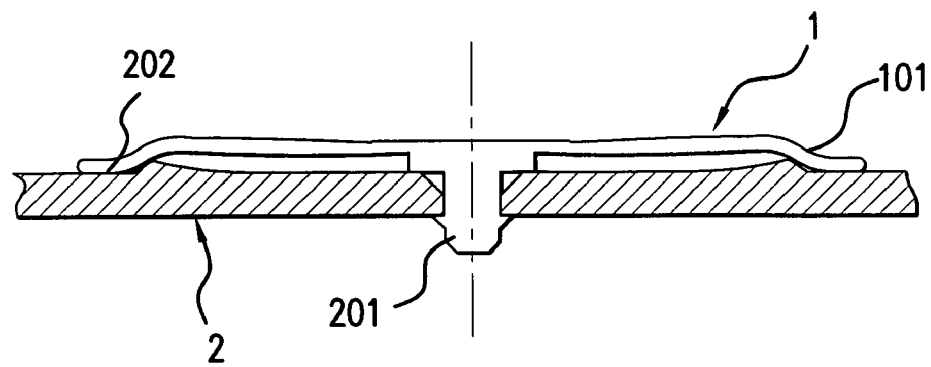
FIG. 1 illustrates a cross-sectional view of a membrane valve in a state of rest as in the prior art.
Figure 2:
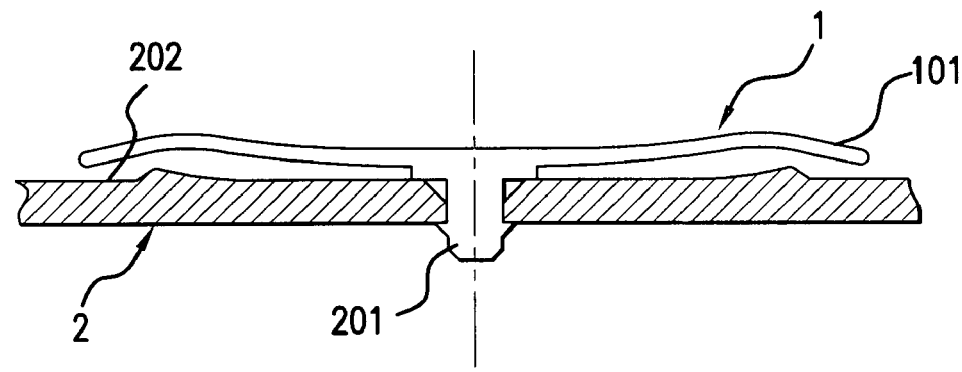
FIG. 2 is a cross-sectional view of a membrane valve during outflow of liquid or gas as in the prior art.
Figure 3:
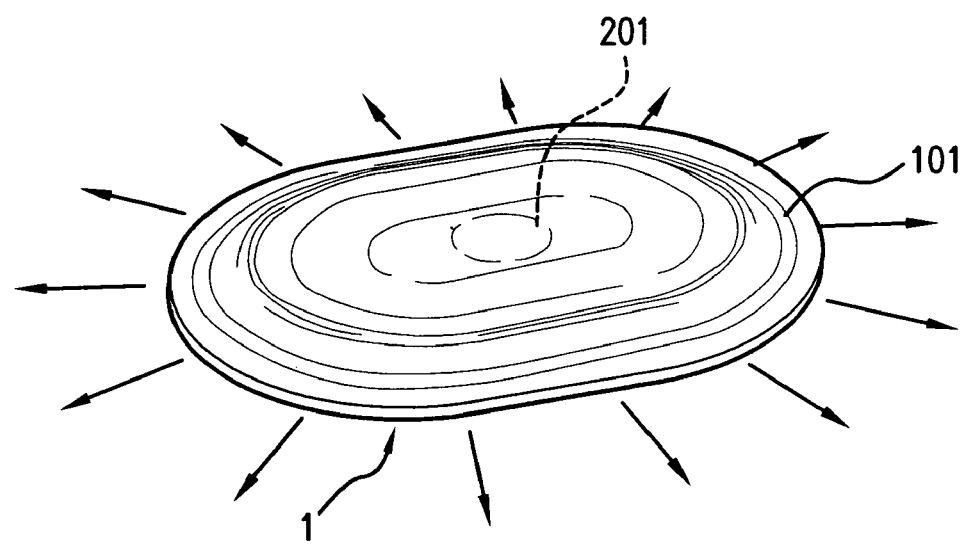
FIG. 3 illustrates a perspective view of an elongated shutter disk.
Figure 4:
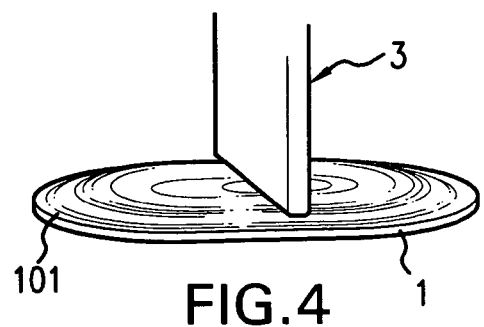
FIG. 4 illustrates a perspective view of a membrane valve according to a first embodiment of the invention when in a state of rest.
Figure 5:
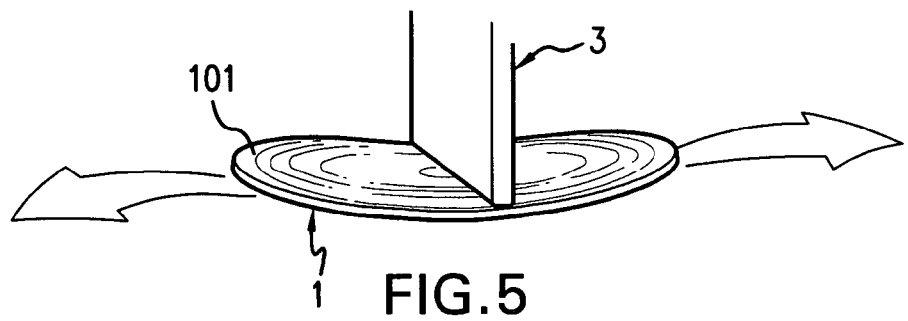
FIG. 5 illustrates a perspective view of a membrane valve according to a first embodiment of the invention during outflow of liquid or gas.
Figure 6:
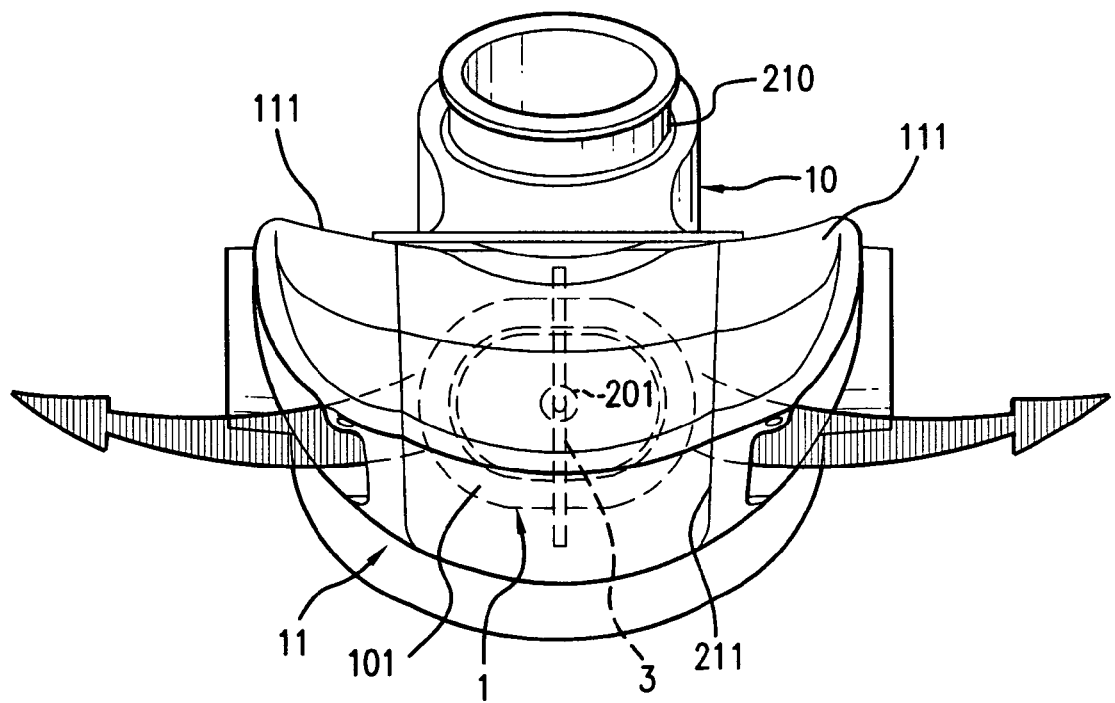
FIG. 6 illustrates a perspective view of a second stage pressure regulator incorporating a membrane valve according to the present invention.

FIGS. 4 and 5 illustrate a membrane valve including a first embodiment of the invention. A stop rib 3 is adjacent to a diameter of shutter disk 1, on the face opposite to valve seat 2, and controls the elastic deformation of shutter disk 1. Stop rib 3 is either in contact or in close proximity to shutter disk 1, and may or may not exercise pressure on shutter disk 1. Stop rib 3 may exhibit different forms, for instance, stop rib 3 may be blade-shaped with a peripheral edge 103 of square form, of tapered form, of beveled form, or of a rounded form. When peripheral edge 103 has a rounded form, engraving marks on shutter disk 1 are reduced or eliminated.

Because stop rib 3 either prevents or reduces the swelling deformation of shutter disk 1 under overpressure conditions, stop rib 3 forces shutter disk 1 to lift its peripheral portions as if shutter disk 1 were hinged along stop rib 3, thereby causing the membrane valve to open in a book-like fashion. Further, the book-like opening of shutter disk 1 causes the portions of sealing lip 101 that are most distant from stop rib 3 to lift at greater height than in the prior art, thereby increasing the available passageway and the outflow of liquid or gas.

This first embodiment of the invention comprises a shutter disk that may have different shapes, for instance, circular, elliptical, or elongate with either straight or semicircular head segments joined by straight or arched perimeter lines. Further, shutter disk 1 may have peripheral extension lobes. Still further, shutter disk 1 may have a symmetrical or asymmetrical shape in relation to primary clamping pin 201.

Stop rib 3 may be positioned across different diameters of shutter disk 1, for instance, across the shortest diameter. Further, in different variations of the present embodiment, stop rib 3 may also be in a position that is either coincident with or offset from primary clamping pin 201, may be positioned in a non-diametrical position, and may have a diverging profile, wherein part of stop rib 3 may be in contact with shutter disk 1 along a single line and part of stop rib 3 may be in contact with shutter disk 1 along two lines.

The shape of stop rib 3 affects the contact surface of stop rib 3 with shutter disk 1 and the opening behavior of the valve under overpressure conditions. Therefore, different shape combinations of stop rib 3 and of shutter disk 1 may be employed in order to achieve the desired operating performance of the valve.

Numerous other embodiments of the present invention are possible. The embodiments shown in FIGS. 12-17 are illustrative rather than limiting, and other embodiments different from those described herein fall also within the scope and spirit of the present invention. Specifically, the embodiments in FIGS. 12-17 are shown in relation to a valve seat that comprises an elongate or substantially elliptic depression 302 having quadrants that are spaced by radial ribs 402, and that further comprises a central hub 102, defined by the convergence of radial ribs 402 and containing the central opening that engages clamping pin 201. Nevertheless, the embodiments shown in FIGS. 12-17 equally apply to valve seats of different designs.

Figure 12A:
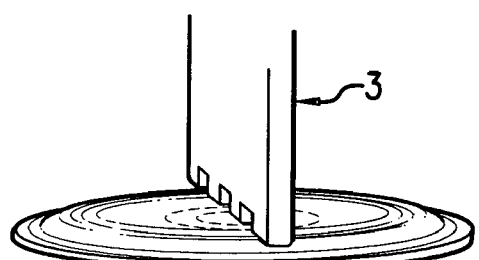
FIGS. 12A and 12B illustrate a perspective and a plane view of a membrane valve according to a second embodiment of the present invention.
Figure 12B:
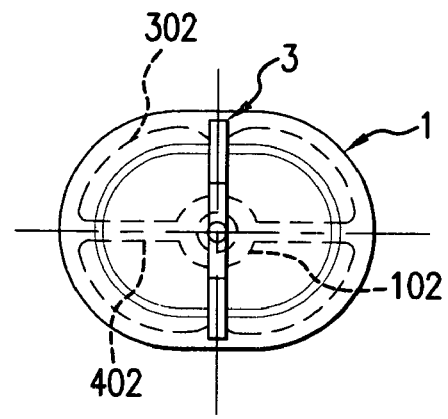

FIGS. 12A and 12B illustrate a perspective view and a plan view of a second embodiment of the invention, wherein stop rib 3 is in discontinuous contact with shutter disk 1 because edge 103 has a toothed profile. Variations of this embodiment comprise edge 103 with a comb-like profile.

Figure 13A:
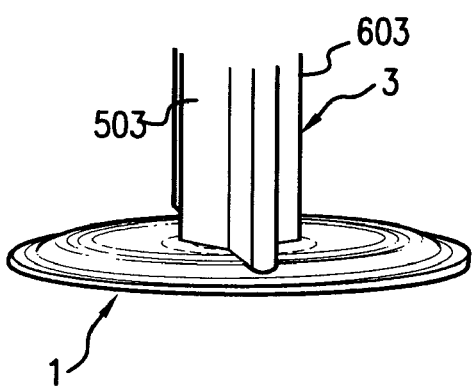
FIGS. 13A and 13B illustrate a perspective and a plane view of a membrane valve according to a third embodiment of the present invention.
Figure 13B:
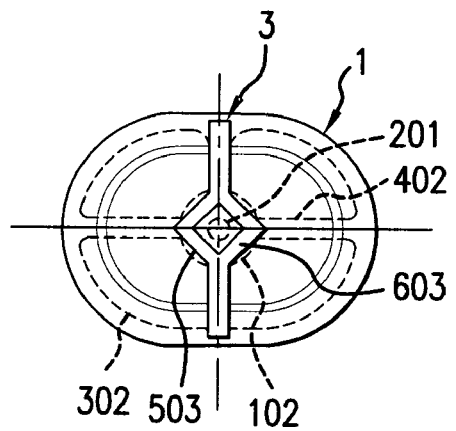

FIGS. 13A and 13B illustrate a third embodiment of the invention, wherein the central portion of edge 103 has an extended profile in the area corresponding to primary clamping pin 201. Such extended profile includes protrusions 503 and 603 that first extend in divergent directions and then converge to disappear within the main body of stop rib 3. Protrusions 503 and 603 may exhibit either polygonal or curvilinear shapes, and may be positioned over the area of shutter disk 1 corresponding to clamping pin 201 or elsewhere. Variations of this embodiment comprise protrusions 503 and 603 that extend in divergent direction but do not converge to disappear within the main body of stop rib 3.

FIGS. 15A and 15B and 16A and 16B illustrate two variations of a fourth embodiment of the invention, wherein stop rib 3 consists of a row of rod-shaped members 33 spaced from each other. The number and dimensions of rod-shaped members 33 varies according to the construction particulars and to the desired operating performance of the valve, for instance, according to the flexibility of the material of shutter disk 1. Specifically, FIGS. 16A and 16B show a variation of this fourth embodiment, wherein stop rib 3 consists of only two rod-shaped members 33.

Figure 14A:
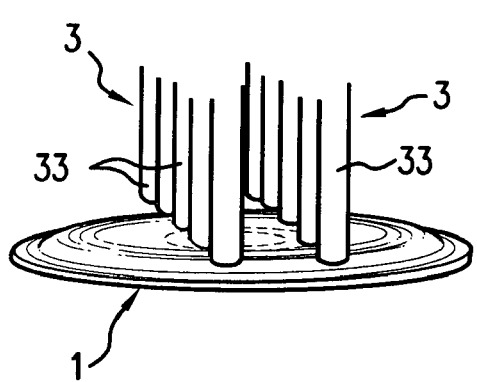
FIGS. 14A and 14B illustrate a perspective and a plane view of a membrane valve according to a sixth embodiment of the present invention.
Figure 14B:
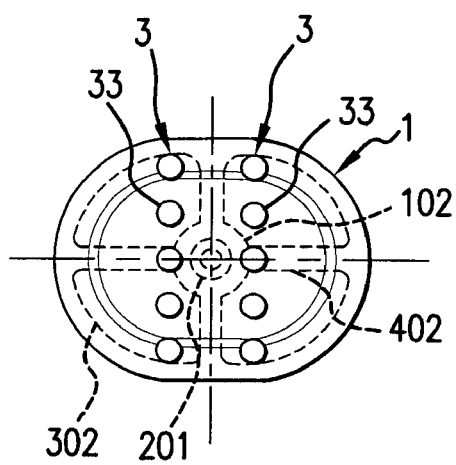

FIGS. 17A and 17B and 14A and 14B illustrate a fifth and a sixth embodiment of the invention, wherein two rather than one stop ribs 3 are present, either in the form of two blade-shaped bodies as in FIGS. 17A and 17B, or of two rows of rod-shaped members 33 as in FIGS. 14A and 14B. The two stop ribs 3 may be located either in a symmetrical or asymmetrical position, and either on different sides or on the same side, in relation to the minor median axis of shutter disk 1, and shutter disk 1 may be affixed to valve seat 2 by one or two clamping pins 201. Further, the two stop ribs 3 may be parallel or divergent, or partially parallel and partially divergent.

In particular, in the fifth embodiment shown in FIGS. 17A and 17B, the two stop ribs 3 may exhibit edges 103 of different shapes, for instance square, toothed, tapered, beveled or rounded. Instead, in the sixth embodiment shown in FIGS. 14A and 14B, the two rows of rod-shaped members 33 may each include different numbers of rod-shaped members 33. A variation of this sixth embodiment comprises a configuration with two stop ribs 3, one of which is blade-shaped and the other one of which is a row of rod-shaped members 33.

While all embodiments of the present invention have been described and illustrated with reference to shutter disk 1 having an elongate shape that is of symmetrical shape relative to primary clamping pin 201, the present invention equally applies to shutter disks of different symmetrical and asymmetrical shapes and to shutter disks with different types of symmetries and with off-center positions of primary clamping pin 201.

Equally, all embodiments of the present invention apply to membrane valves with shutter disks 1 having two primary clamping pins 201.

In a seventh embodiment of the invention, stop rib 3 is replaced by one or more rows of secondary clamping pins that extend from the side of shutter disk 1 facing valve seat 2 and that are engaged in matching openings in valve seat 2, thereby forcing the outflow of gas or liquid through the membrane valve to proceed along two or more passageways according to the position of the rows of secondary clamping pins. The secondary clamping pins may have the same or different sizes as primary clamping pin or pins 201, and the rows of secondary clamping pins may or may not include the primary clamping pin or pins 201. For instance, shutter disk 1 may have two primary clamping pins 201 and two parallel rows of secondary clamping pins, with each row of secondary clamping pins including one primary clamping pin 201. In a variation of this embodiment, the secondary clamping pins are aligned along one or more of the ribs 402 that crossing the depression encircling the opening in valve seat 2.

In an eighth embodiment of the invention, one or more stop ribs 3, either in the forms of blades or of rows of rod-shaped members 33, are situated in positions matching some or all the rows of the secondary clamping pins. Different combinations of stop ribs 3 and of secondary clamping pins are included in this eighth embodiment, for instance, a configuration including two stops ribs 3, one blade-shaped and the other consisting of a row of rod-shaped members 33, and two rows of secondary clamping pins, with each stop rib 3 facing one row of secondary clamping pins, or a configuration with a first row of secondary clamping pins matched by a stop rib 3 and a second row of secondary clamping pins not matched by a stop rib 3, or a configuration with one row of secondary clamping pins not matched by a stop rib 3 and a stop rib 3 not matched by a row of secondary clamping pins.

FIGS. 6-11 illustrate a second stage pressure reducer for a two-stage underwater regulator (hereinafter, "second stage") comprising a membrane valve according to the present invention.

Specifically, FIGS. 6-11 illustrate a second stage incorporating a membrane valve with a shutter disk of elongated shape and one central clamping pin. Nevertheless, FIGS. 6-11 and the related descriptions should not be interpreted in a limiting sense, but rather as descriptive of one embodiment of the invention, with other embodiments of the membrane valve that are part of the present invention and that are different from those described herein falling within the scope and spirit of the present invention.

Peripheral portions 111 of outflow duct 11 are affixed to case 10, while central portion 211 is removable and, with reference to the longitudinal axis of outflow duct 11, is substantially as wide or wider than shutter disk 1, in order to allow access to the membrane valve for cleaning or other maintenance purposes. Central portion 211 of outflow duct 11 includes stop rib 3, which stop rib 3 extends from central portion 211 in the direction of shutter disk 1. When central portion 211 is secured to peripheral portions 111, making outflow duct 11 a continuum, peripheral edge 103 of stop rib 3 is substantially in contact with shutter disk 1, thereby improving the operating performance of the membrane valve.

Figure 7:
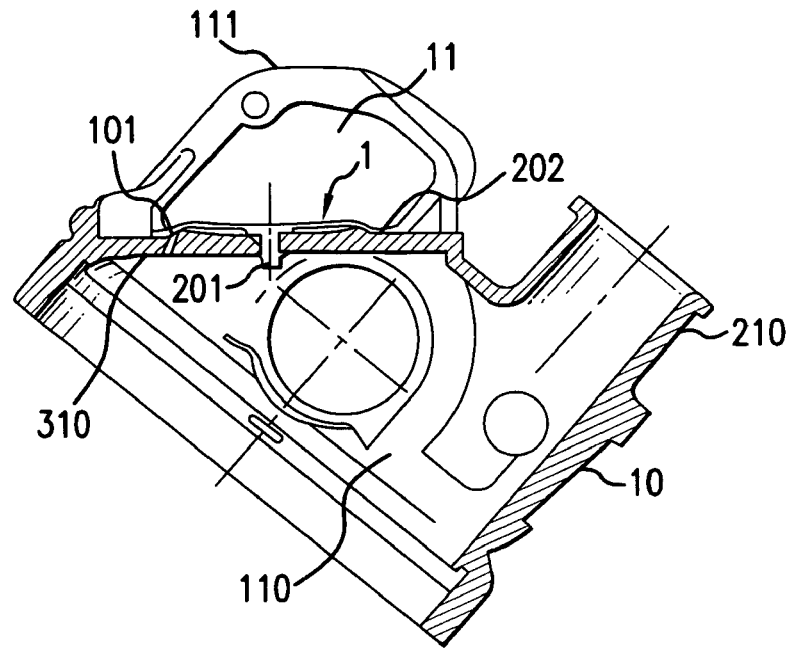
FIG. 7 illustrates a cross-sectional view of a second stage pressure regulator incorporating a membrane valve according to the present invention, wherein the central section of the outflow duct over the membrane valve is a removable cap element.
Figure 8:
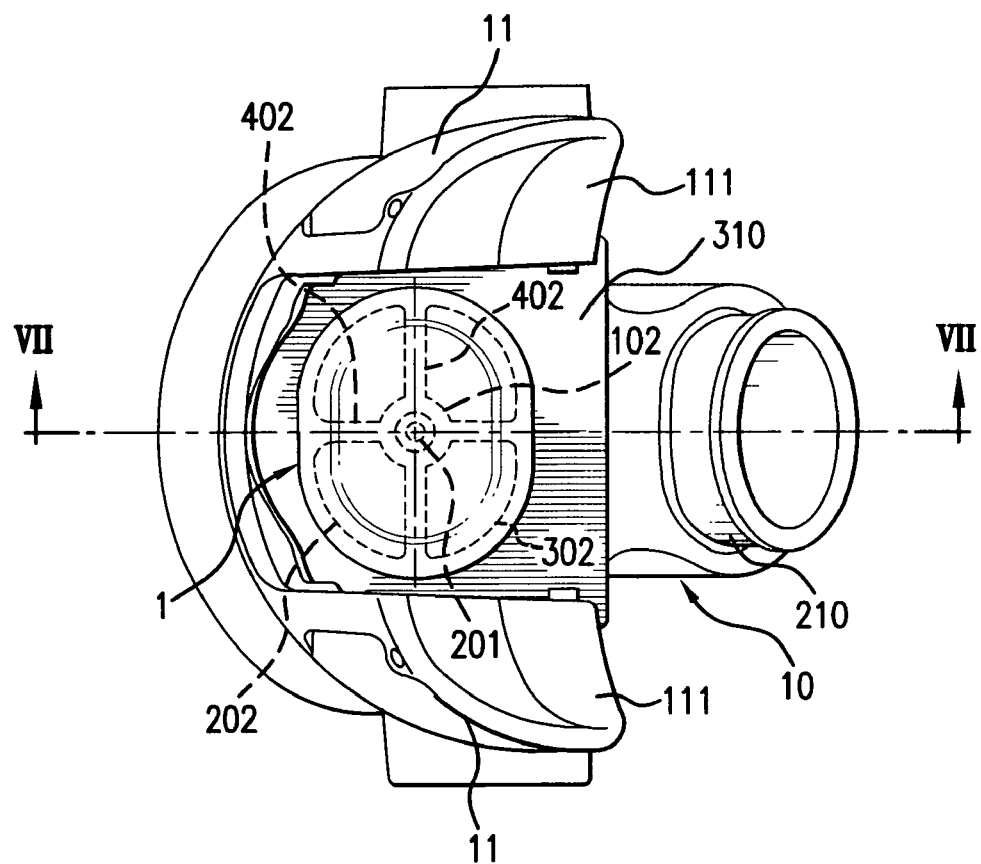
FIG. 8 illustrates a perspective view of a second stage pressure regulator shown in FIG. 7.

With specific reference to FIGS. 7-8, it can be seen that shutter disk 1 in an open condition enables fluid flow through the valve seat, and also that shutter disk 1 in a closed condition prevents such fluid flow. The valve seat is situated within a flattening of the wall of valve case 10, that is, within a planar portion of valve case 10. In one embodiment, such planar portion is inclined (that is, it is disposed at an angle different from 90 degrees) in relation to the longitudinal axis of mouthpiece 210 of the second stage.

Figure 11:
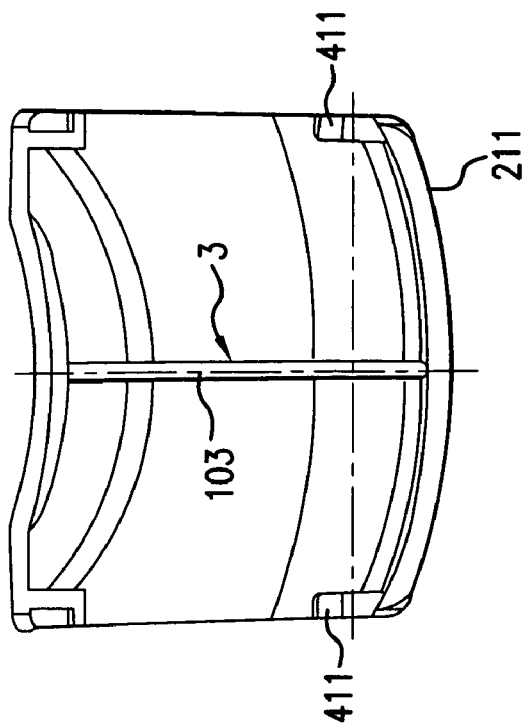
FIG. 11 illustrates a plane view of the central section of the outflow duct of a second stage pressure regulator according to one embodiment the present invention, wherein said central section is a removable cap element.
Figure 10:
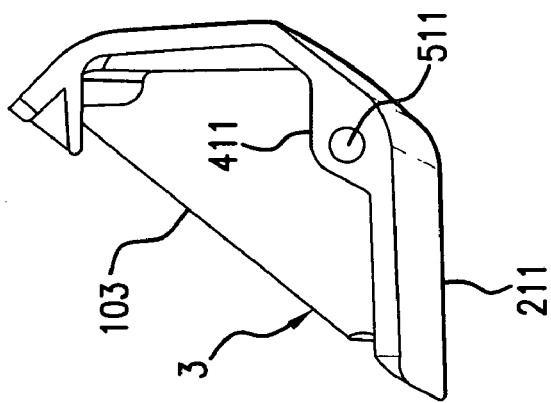
FIG. 10 illustrates a perspective view of a detail of the central section of the outflow duct of a second stage pressure regulator according to one embodiment the present invention, wherein said central section is a removable cap element.
Figure 9:
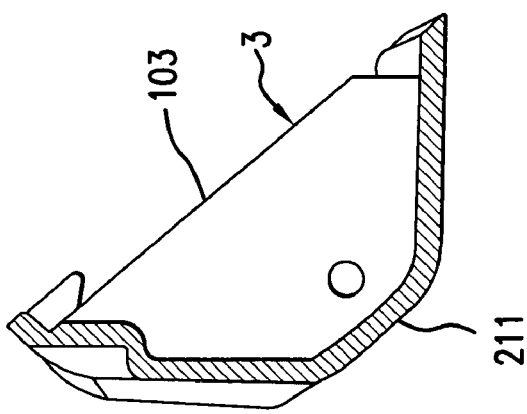
FIG. 9 illustrates a cross-sectional view of the central section of the outflow duct of a second stage pressure regulator according to the present invention, wherein said central section is a removable cap element.

In particular, FIGS. 7-11 illustrate the different constituent components of a second stage according to the present invention, with FIGS. 7-8 showing the second stage without central portion 211, and FIGS. 9-11 showing central portion 211 in detail.

Central portion 211 is designed to fit between peripheral portions 111 and may be secured to peripheral portions 111 in a variety of ways, for instance, with connecting pins extending from peripheral elements 111, which connecting pins engage in corresponding holes 511 that are situated in ears 411 of central portion 211. Conversely, the connecting pins may be removavable and be inserted both in holes 511 on central portion 211 and in matching holes on peripheral portions 111. Further, central portion 211 may be entirely removable from the second stage, or may open in a clamshell-like fashion, thereby providing access to the membrane valve in either case.

Central portion 211 has a U-shaped profile, with stop rib 3 extending from the concave face of the "U" and with peripheral edge 103 of stop rib 3 coming substantially in contact with shutter disk 1. Peripheral portions 111 are each connected to central portion 211 at one end and are open to the external environment at the opposite end, so that the coupling of central portion 211 with peripheral portions 111 forms outflow duct 11 having open head sections at the terminal ends. As shown in FIG. 8, the longitudinal axis of outflow duct 11 is essentially perpendicular to mouthpiece 210, but the open head sections may be oriented at an angle different than 90 degrees in relation to mouthpiece 210, typically larger than 90 degrees, in order to orient the air ejected from the driver away from the diver's field of view.

When stop rib 3 is substantially in contact with shutter disk 1, outflow of gas through the membrane valve is directed towards the orifices of outflow duct 11. Therefore, the addition of stop rib 3 to the second stage causes not only an improvement in the operating performance of the membrane valve by increasing the available passageway for the spent gas, but also an improvement in the outflow pattern of the gas by directing such gas towards the orifices of outflow duct 11. These improvements further increase the efficiencies of the membrane valve and reduce the exhalation pressure of the user.

Additionally, the user enjoys an improved field of view because the breathing gas is directed more effectively in a desired direction when expelled from outflow duct 11, generally sideways and at angles of no less than 90 degrees in relation to the longitudinal axis of the mouthpiece.

In different embodiments of the present invention, two stop ribs 3 may extend from central portion 211 of outflow duct 11.

Membrane valves according to the present invention may be employed in fields other than underwater pressure regulators, yet fall within the spirit and scope of the present invention.

While the invention has been described in connection with a number of embodiments, it is not intended to limit the scope of the invention to the particular forms set forth, but it is intended instead to cover such alternatives, modifications, and equivalents as may be included within the spirit and scope of the invention as defined in the appended claims.

What is claimed is:

1. A membrane valve comprising:
   a valve case including a valve seat, the valve seat having an opening, one or more ribs extending across the opening;
   a shutter disk manufactured from a flexible material, the shutter disk engaging one of the one or more ribs;
   an outflow duct coupled to the valve case and enclosing the valve seat, flow communication between the valve seat and the outflow duct being controlled by a displacement of the shutter disk, the outflow duct having an openable central portion connected to a plurality of outflow peripheral portions; and
   a retaining member extending from the central portion of the outflow duct, the retaining member causing a portion of the shutter disk to remain substantially in contact with the valve seat during fluid passage through the valve seat.

2. The membrane valve of claim 1, wherein the retaining member is a stop rib.

3. The membrane valve of claim 2, wherein the stop rib has a peripheral edge substantially in contact with the stop rib, and wherein the peripheral edge is square, tapered, beveled, or rounded.

4. The membrane valve of claim 2, wherein the stop rib has a peripheral edge substantially in contact with the stop rib, and wherein the peripheral edge is continuous, discontinuous, toothed, or comb-shaped.

5. The membrane valve of claim 2, wherein the stop rib comprises two protrusions, the two protrusions extending from opposite sides of the stop rib.

6. The membrane valve of claim 1, wherein the shutter disk engages one of the one or more ribs by having a clamping pin extend from the shutter disk and engage a mating aperture in the rib.

7. The membrane valve of claim 1, wherein the retaining member is aligned with one of the one or more ribs.

8. The membrane valve of claim 1, further comprising an annular wall in the valve seat extending outwardly of the valve case, the annular wall surrounding the opening on one side, a peripheral sealing lip extending from the shutter disk and engaging the annular wall when no fluid flows through the opening.

9. The membrane valve of claim 1, wherein the coupling of the outflow duct with the valve case defines a tubular conduit, and wherein the tubular conduit extends laterally in relation to the valve seat.

10. The membrane valve of claim 1, wherein the central portion is openable by being removable from the outflow peripheral portions.

11. The membrane valve of claim 1, wherein the central portion is openable by being hinged to the outflow peripheral portions.

12. The membrane valve of claim 1, wherein the shutter disk has an elongated shape, the elongated shape having the longest diameter oriented in a direction parallel to the longitudinal axis of the outflow duct.

13. The membrane valve of claim 1, wherein the retaining member comprises a row of columnar elements.

14. The membrane valve of claim 1, wherein the retaining member comprises two stop ribs spaced one from the other.

15. The membrane valve of claim 1, wherein the retaining member comprises two rows of columnar elements spaced one from the other.

16. A second stage pressure reducer for two stage pressure regulators comprising:
- a chamber for storing and delivering breathing gas to a diver;
- an outlet connecting the chamber to a mouthpiece;
- an inlet connecting the chamber to a first stage pressure reducer, the first stage pressure reducer being further connected to a high pressure source of the breathing gas;
- a spring valve housed within the chamber, the spring valve regulating the inflow of the breathing gas into the chamber from the first stage pressure reducer, the spring valve being in an open condition when pressure within the chamber falls below a predetermined level and being in a closed condition otherwise; and
- a membrane valve regulating the outflow of spent gas from the diver, the membrane valve being housed in the case and comprising,
  - a valve case including a valve seat, the valve seat having an opening, one or more ribs extending across the opening;
  - a shutter disk manufactured from a flexible material, the shutter disk engaging one of the one or more ribs;
  - an outflow duct coupled to the valve case and enclosing the valve seat, the coupling of the outflow duct with the valve case defining a tubular conduit, flow communication between the valve seat and the outflow duct being controlled by a displacement of the shutter disk, the outflow duct extending laterally in relation to the valve seat, the outflow duct further having an openable central portion connected to a plurality of outflow peripheral portions; and
  - a retaining member extending from the central portion of the outflow duct, the retaining member causing a portion of the shutter disk to remain substantially in contact with the valve seat during passage of the spent gas through the valve seat.

17. The second stage pressure reducer of claim 16, wherein the retaining member is a stop rib.

18. The second stage pressure reducer of claim 17, wherein the stop rib comprises two protrusions, the two protrusions extending from opposite sides of the stop rib.

19. The second stage pressure reducer of claim 16, wherein the valve seat is situated in a planar portion of the valve case.

20. The second stage pressure reducer of claim 19, wherein the planar portion is inclined in relation to the longitudinal axis of the mouthpiece.

21. The second stage pressure reducer of claim 16, wherein the outflow peripheral portions direct the spent gas at an angle not perpendicular to the longitudinal axis of the mouthpiece.

22. The second stage pressure reducer of claim 16, wherein the central portion is openable by being removable from the outflow peripheral portions.

23. The second stage pressure reducer of claim 16, wherein the central portion is openable by being hinged to the outflow peripheral portions.

24. The second stage pressure reducer of claim 16, wherein the retaining member comprises a row of columnar elements.

25. The second stage pressure reducer of claim 16, wherein the retaining member comprises two stop ribs spaced one from the other.

26. The second stage pressure reducer of claim 16, wherein the retaining member comprises two rows of columnar elements spaced one from the other.

* * * * *